(12) United States Patent
Bidigare et al.

(10) Patent No.: US 9,377,269 B2
(45) Date of Patent: Jun. 28, 2016

(54) APPARATUS FOR MOUNTING A SIDEBAR TO AN ARCHERY BOW

(71) Applicant: K TECH DESIGNS, L.L.C., Flint, MI (US)

(72) Inventors: Eric C. Bidigare, Flint, MI (US); Kerry A. Verran, Davison, MI (US)

(73) Assignee: K Tech Designs, L.L.C., Flint, MI (US)

( * ) Notice: Subject to any disclaimer, the term of this patent is extended or adjusted under 35 U.S.C. 154(b) by 0 days.

(21) Appl. No.: 14/531,062

(22) Filed: Nov. 3, 2014

(65) Prior Publication Data

US 2016/0123695 A1 May 5, 2016

(51) Int. Cl.
*F41B 5/14* (2006.01)
*F41B 5/10* (2006.01)
*F16C 11/00* (2006.01)

(52) U.S. Cl.
CPC .............. *F41B 5/1426* (2013.01); *F41B 5/10* (2013.01); *F41B 5/14* (2013.01); *F16C 11/00* (2013.01)

(58) Field of Classification Search
CPC .......... F41B 5/14; F41B 5/1426; F41C 11/10; F16C 11/10
USPC .................................. 124/86, 88, 89; 403/97
See application file for complete search history.

(56) References Cited

U.S. PATENT DOCUMENTS

| | | | | |
|---|---|---|---|---|
| 3,342,172 A * | 9/1967 | Sanders | ............... | F41B 5/1426 124/23.1 |
| 4,054,121 A * | 10/1977 | Hoyt, Jr. | ............... | F41B 5/1426 124/88 |
| 4,491,123 A * | 1/1985 | Wirtz | ............... | B60G 21/0551 124/89 |
| 4,553,522 A * | 11/1985 | Topping | ............... | F41B 5/1426 124/89 |
| 4,582,445 A * | 4/1986 | Warshawsky | ........... | F16C 11/10 403/146 |
| 4,704,800 A * | 11/1987 | Stinson | ................... | F41G 1/467 124/25.7 |
| 4,917,343 A * | 4/1990 | Wainscott | .............. | A47B 23/06 248/284.1 |
| 5,137,008 A * | 8/1992 | Taylor | ...................... | F41B 5/14 124/23.1 |
| 5,178,122 A * | 1/1993 | Simonds | ................... | F41B 5/10 124/25.6 |
| 5,239,977 A * | 8/1993 | Thomas | ............... | F41B 5/1426 124/88 |
| 5,320,085 A * | 6/1994 | Hanneman | ........... | F41B 5/1426 124/86 |

(Continued)

*Primary Examiner* — Alexander Niconovich
(74) *Attorney, Agent, or Firm* — Young Basile Hanlon & MacFarlane P.C.

(57) ABSTRACT

The present invention provides an apparatus for mounting a sidebar to an archery bow having at least one interlocking coupling. Each interlocking coupling includes a male mating element, a female mating element, and a fastener that connects the male element to the female mating element. The male mating element has a plurality of protrusion points and is connectable to the sidebar. The female mating element has a substantially cylindrical aperture defined by a plurality of arcuate recesses and is connectable to the archery bow. The plurality of protrusion points on the male mating element engage the plurality of arcuate recesses on the female mating element to provide rotational adjustment about an axis. There may be thirty-six arcuate recesses of the female mating element. The plurality of protrusion points of the male mating element may be a factor of three.

20 Claims, 5 Drawing Sheets

(56) References Cited

U.S. PATENT DOCUMENTS

| | | | | |
|---|---|---|---|---|
| 5,513,622 A * | 5/1996 | Musacchia, Sr. | F16B 7/20 | 124/86 |
| 5,520,164 A * | 5/1996 | Huddleston | F41B 5/14 | 124/86 |
| 5,531,211 A * | 7/1996 | Wilfong, Jr. | F41B 5/14 | 124/25.6 |
| 5,535,731 A * | 7/1996 | Webster | F41B 5/1426 | 124/89 |
| 5,619,981 A * | 4/1997 | Breedlove | F41B 5/1426 | 124/86 |
| 5,630,407 A * | 5/1997 | Gasser | F41B 5/1426 | 124/89 |
| 5,934,266 A * | 8/1999 | Martin | F41B 5/1426 | 124/88 |
| 5,992,403 A * | 11/1999 | Slates | F41B 5/1426 | 124/89 |
| 6,070,569 A * | 6/2000 | Chalin | F41B 5/1426 | 124/86 |
| 6,152,124 A * | 11/2000 | Gallops, Jr. | F41B 5/10 | 124/25.6 |
| 6,205,992 B1 * | 3/2001 | Meeks | F41B 5/14 | 124/86 |
| 6,619,872 B2 * | 9/2003 | Crorey | B25J 15/0052 | 403/54 |
| 6,957,648 B1 * | 10/2005 | Adcock | F41B 5/1426 | 124/86 |
| 7,367,740 B2 * | 5/2008 | Lazic | F16C 11/10 | 248/125.1 |
| 7,721,724 B2 * | 5/2010 | Goade | F41B 5/1426 | 124/86 |
| 7,958,881 B2 * | 6/2011 | Silverson | F41B 5/1426 | 124/86 |
| 8,347,870 B1 * | 1/2013 | Mahutga | F41B 5/1426 | 124/89 |
| 8,534,273 B2 * | 9/2013 | LoRocco | F41B 5/1426 | 124/86 |
| 8,572,796 B2 * | 11/2013 | Major | A46B 5/0095 | 15/144.1 |
| 8,695,581 B2 * | 4/2014 | Felt | F41B 5/148 | 124/89 |
| 8,701,645 B2 * | 4/2014 | Stokes | F41B 5/1426 | 124/89 |
| 8,819,983 B2 * | 9/2014 | Tate | F16M 11/041 | 124/88 |
| 8,839,774 B1 * | 9/2014 | Torbett | F41B 5/1453 | 124/88 |
| 8,893,701 B1 * | 11/2014 | Entrup | G03B 29/00 | 124/86 |
| 9,038,617 B1 * | 5/2015 | Khoshnood | F41B 5/1426 | 124/89 |
| 2012/0263519 A1 * | 10/2012 | Kotula | B25J 15/0061 | 403/84 |
| 2013/0263839 A1 * | 10/2013 | Dominski | F41B 5/1426 | 124/23.1 |
| 2014/0060514 A1 * | 3/2014 | Bidigare | F41B 5/1426 | 124/88 |
| 2014/0352679 A1 * | 12/2014 | Torbett | F41B 5/1453 | 124/89 |
| 2015/0184973 A1 * | 7/2015 | Martens | F41B 5/1426 | 124/23.1 |

* cited by examiner

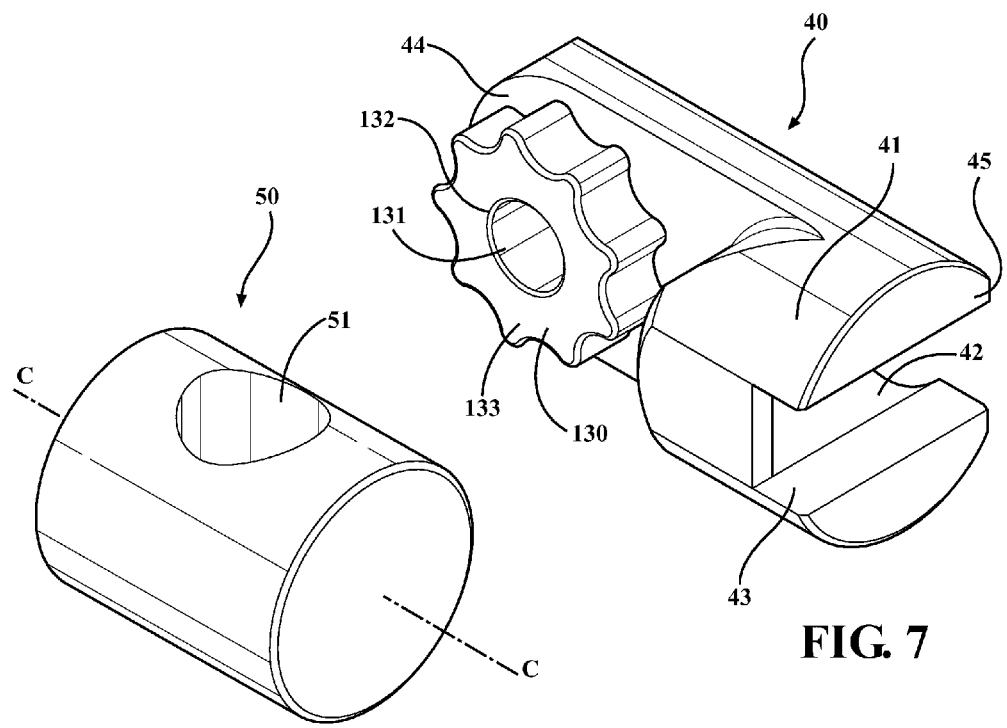
FIG. 7
FIG. 8
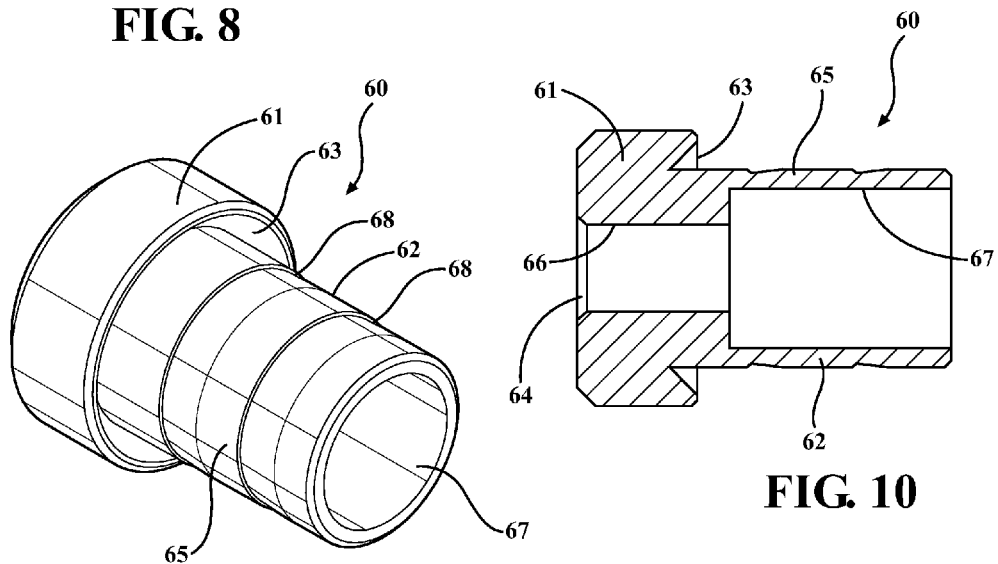
FIG. 9
FIG. 10

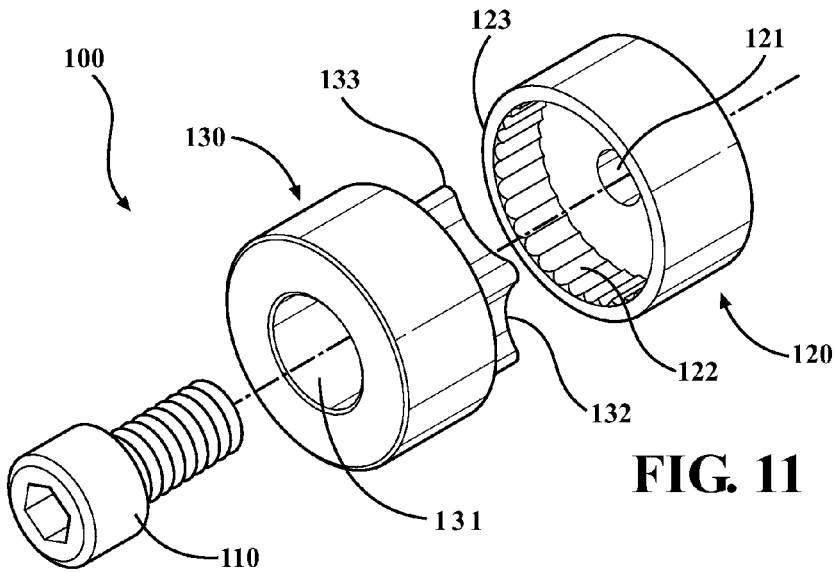
FIG. 11
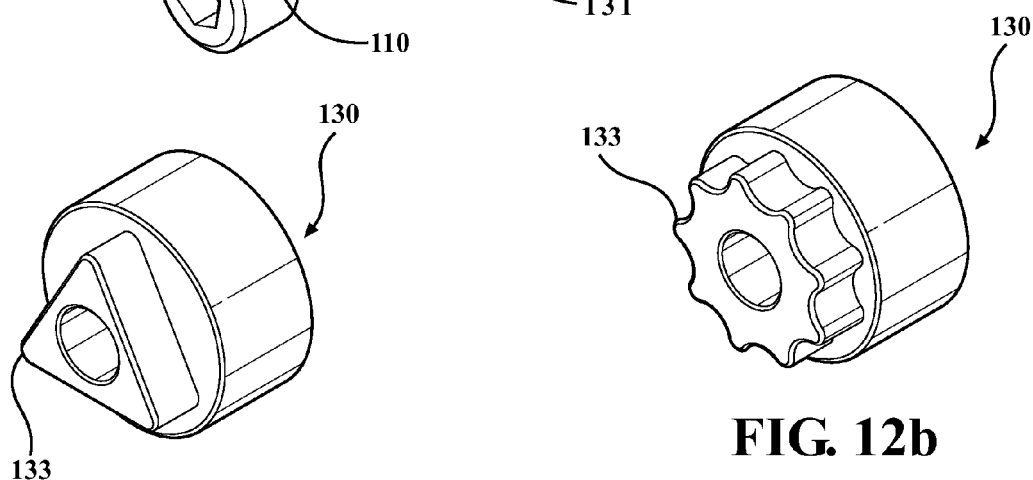
FIG. 12a
FIG. 12b
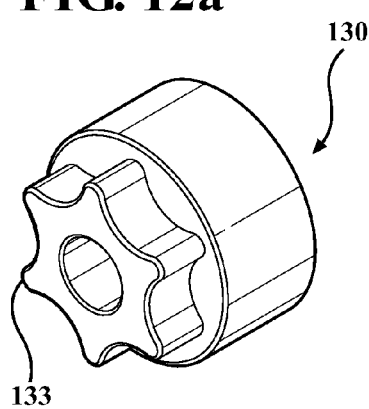
FIG. 12c
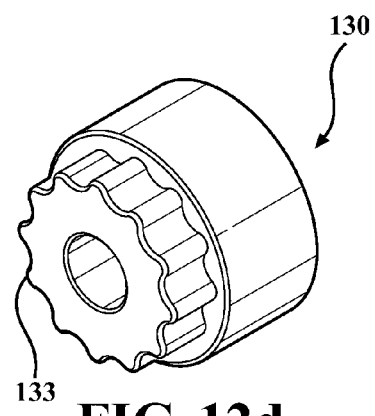
FIG. 12d

APPARATUS FOR MOUNTING A SIDEBAR TO AN ARCHERY BOW

TECHNICAL FIELD

The present invention relates generally to stabilizers for archery bows, and more particularly, to an apparatus for mounting a side bar on an archery bow having two interlocking couplings that provide rotational adjustment of the side bar about two perpendicular axes.

BACKGROUND

An archery bow is a simple mechanical device used to store energy derived from the archer during the drawing of the archery bow. When the archer releases the bow string or cable, the archery bow's energy is rapidly released. The greater portion of this energy is spent on launching the arrow, and much of the remaining energy is directed back to the archery bow, which results in vibration and/or movement of the archery bow. Because the trajectory of the arrow may be affected by any movement or vibration of the archery bow during the arrow's launch, numerous accessories have been designed that attempt to stabilize the archery bow. One such accessory is a sidebar.

Traditional sidebars are weighted bars that are statically mounted to an archery bow to provide balance and some vibration dampening. The sidebars may vary in size and weight to allow each archer to find the right combination for his or her archery bow and body type. Manual rotational adjustment of a sidebar is well known within the art. Previous designs have provided for rotation of two sidebars about two axes, wherein rotation of the sidebars can be adjustably maintained through the use of cap screws. Such designs prevent the archer from having only one sidebar or maintaining the position of the sidebars without the use of a cap screw. These designs also require the sidebars to be screwed on, which limits the archer's ability to quickly change the length or weight of the sidebar.

Therefore, it is desirable to have an apparatus for mounting a sidebar that allows for rotational adjustment to be maintained without the use of a cap screw, while also allowing the archer to easily customize the sidebar configuration.

SUMMARY

The present invention provides an apparatus for mounting a sidebar to an archery bow having at least one interlocking coupling. Each interlocking coupling includes a male mating element, a female mating element, and a fastener that connects the male mating element to the female mating element. The male mating element has a plurality of protrusion points and is connectable to the sidebar. The female mating element has a substantially cylindrical aperture defined by a plurality of arcuate recesses and is connectable to the archery bow. The plurality of protrusion points on the male mating element engage the plurality of arcuate recesses on the female mating element to provide rotational adjustment about an axis. There may be thirty-six arcuate recesses of the female mating element. The plurality of protrusion points of the male mating element may be a factor of three. There may be two interlocking couplings that are connected to each other and provide rotational adjustment about two axes. The axes of rotational adjustment may be substantially perpendicular.

BRIEF DESCRIPTION OF THE DRAWINGS

The various features, advantages, and other uses of the present disclosure will become more apparent by referring to the following drawings, in which:

FIG. 7 is a perspective view showing a third mating component of the apparatus of the present invention;

FIG. 8 is a perspective view showing a first connecting component of the apparatus of the present invention;

FIG. 9 is a perspective view showing a second connecting component of the apparatus of the present invention;

FIG. 10 is a cross-sectional view showing the second connecting component of the apparatus of the present invention;

FIG. 11 is a exploded, perspective view showing an interlocking coupling of the apparatus of the present invention;

FIG. 12A is a perspective view showing a male mating portion of the interlocking coupling of the apparatus of the present invention having a substantially triangular configuration;

FIG. 12B is a perspective view showing the male mating portion of the interlocking coupling of the apparatus of the present invention having a substantially six-pointed star configuration;

FIG. 12C is a perspective view showing the male mating portion of the interlocking coupling of the apparatus of the present invention having a substantially nine-pointed star configuration; and FIG. 12D is a perspective view showing the male mating portion of the interlocking coupling of the apparatus of the present invention having a substantially twelve-pointed star configuration.

DETAILED DESCRIPTION

Figure 1:
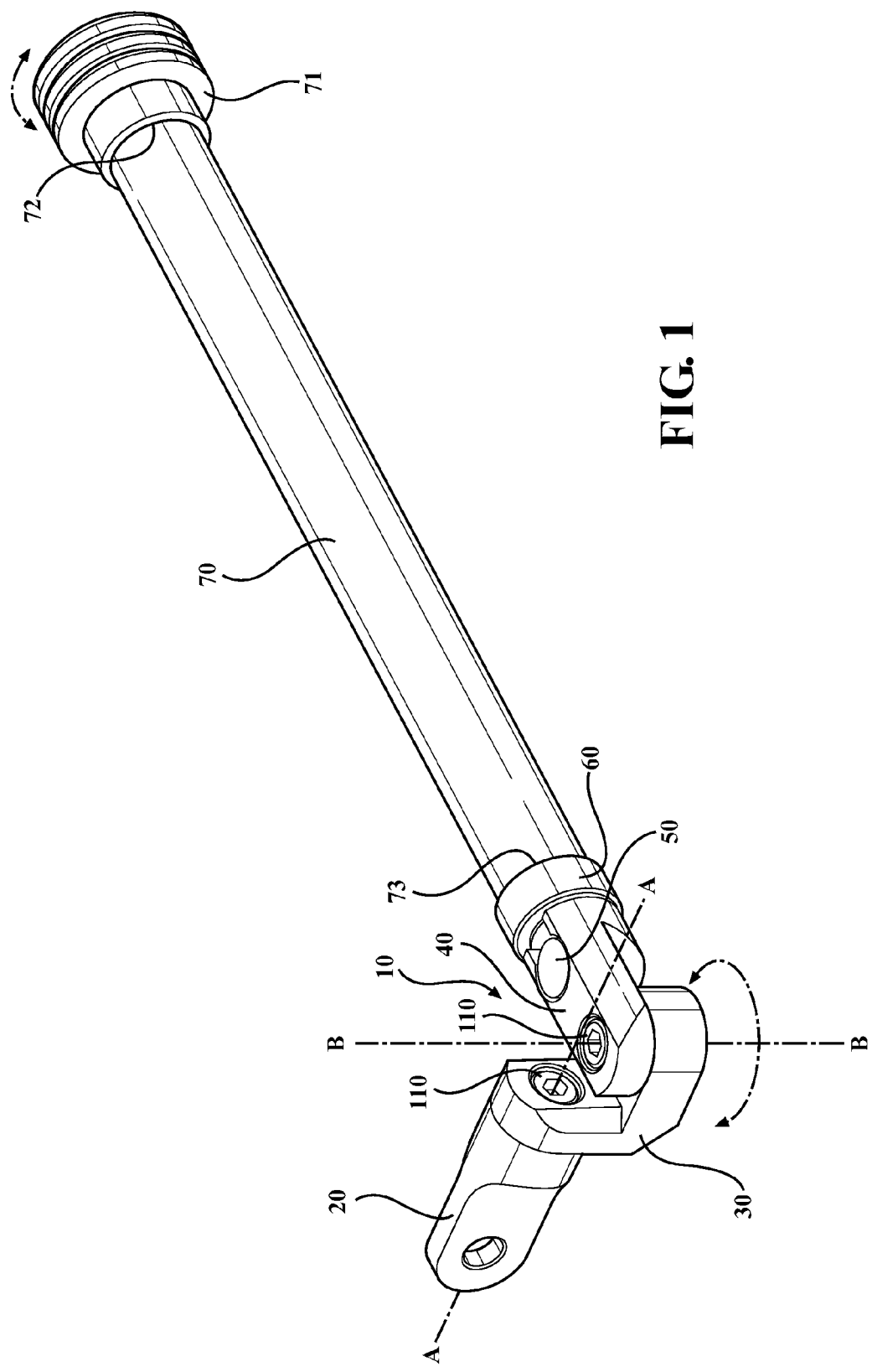
FIG. 1 is a perspective view showing an apparatus for mounting a sidebar to an archery bow of the present invention with the sidebar mounted thereon.

As shown in FIGS. 1-12, the present invention relates to an apparatus 10 for mounting a sidebar 70 and/or weights 71 to an archery bow riser 200, wherein the apparatus 10 of the present invention has two interlocking couplings 100 for rotational adjustment of the sidebar 70 about first and second substantially perpendicular axes A, B. The interlocking couplings 100 in the apparatus 10 of the present invention allow an archer (not shown) to easily find the desired position of the sidebar 70 and/or weights 71, such that an archery bow (not shown) is properly balanced. Once properly balanced, the rotational adjustment of the sidebar 70 is maintained by the interlocking couplings 100 of the apparatus 10 without the use of a cap screw or similar type of fastener. The apparatus 10 of the present invention also allows the archer to quickly change or adjust the sidebar 70 and/or weights 71 as desired.

Figure 2:
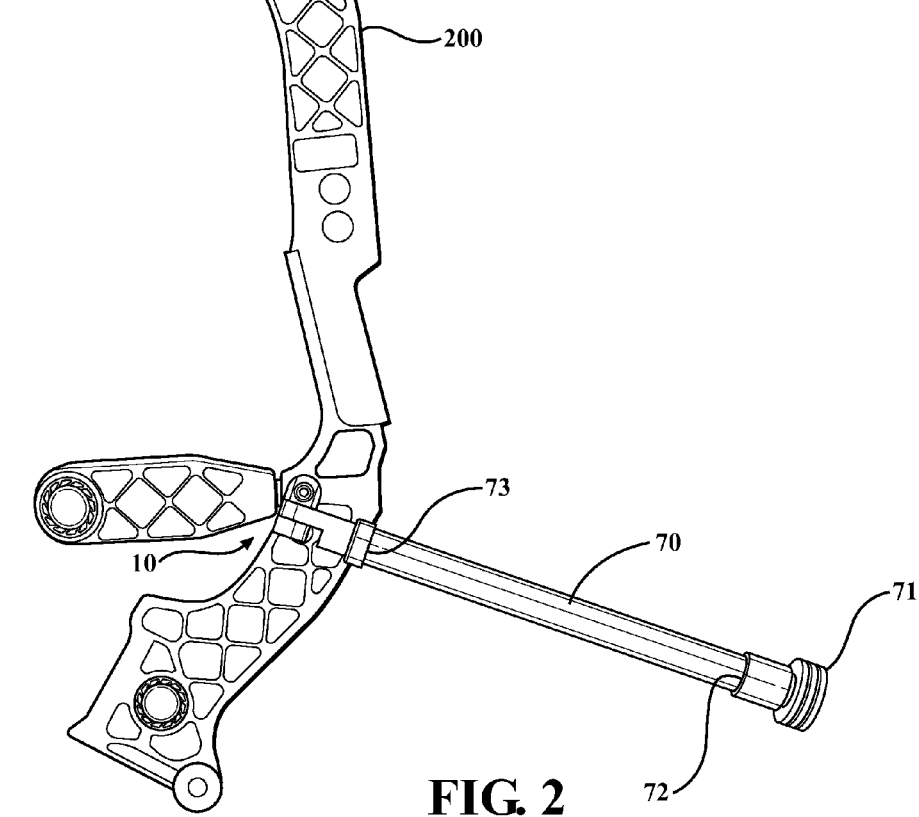
FIG. 2 is a front plan view showing the apparatus of the present invention attached to an archery bow riser.

To attach the apparatus 10 to the archery bow riser 200 as shown in FIG. 1-2, the archery bow riser 200 may have a substantially cylindrical, threaded aperture (not shown) for receiving a conventional fastener (not shown). When the sidebar 70 is mounted to the apparatus 10, and the apparatus 10 is attached to the archery bow riser 200 through the use of the conventional fastener, the sidebar 70 extends longitudinally away from the archery bow and may be rotationally adjusted about the first axis A and the second axis B, wherein the second axis B is substantially perpendicular to the first axis A.

The sidebar 70 is an elongated, tubular element and may be made of a high-strength, lightweight material, such as aluminum. The archer may further customize the apparatus 10 by adding one or more weights 71 to a free end 72 of the sidebar 70. The weights 71 may have a substantially circular aperture (not shown) extending through the radial center of each weight 71 to allow for the weight 71 to be attached to the free end 72 of the sidebar 70 through the use of a conventional fastener (not shown).

Figure 3:
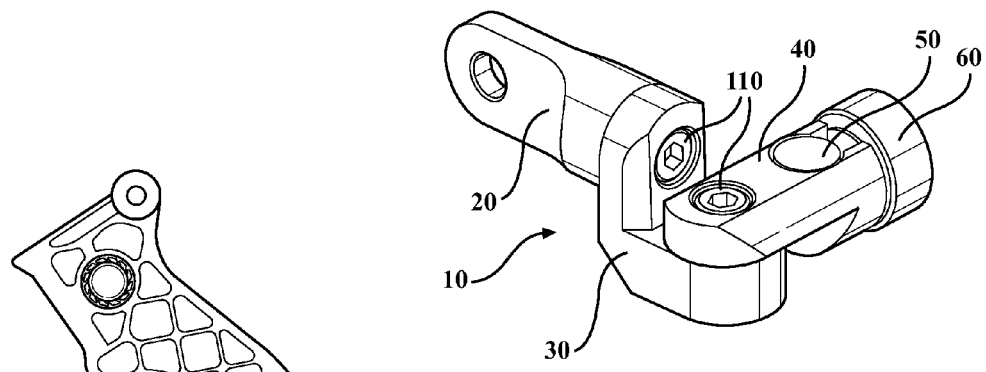
FIG. 3 is a perspective view showing the apparatus of the present invention without the sidebar mounted thereon.
Figure 4:
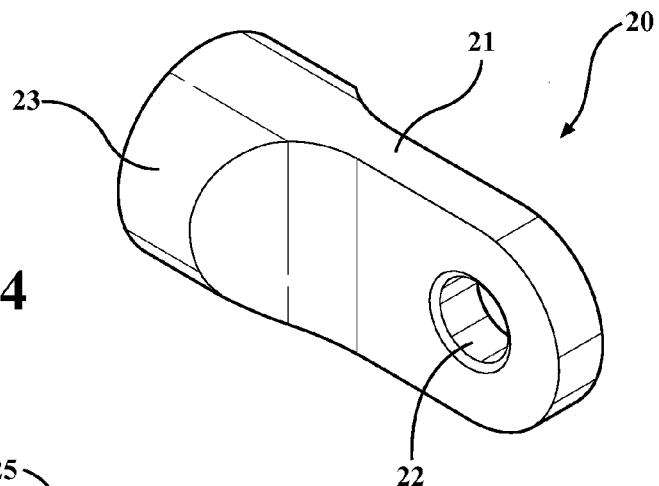
FIG. 4 is a perspective view showing a first mating component of the apparatus of the present invention.
Figure 5:
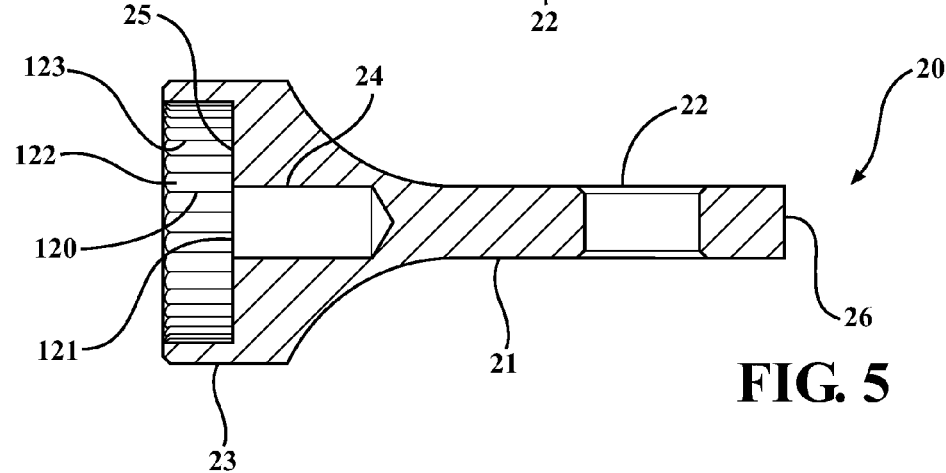
FIG. 5 is a cross-sectional view showing the first mating component of the apparatus of the present invention.

As shown in FIG. 3, the apparatus 10 of the present invention includes a first mating component 20, a second mating component 30, a third mating component 40, and a first connecting component 50. The apparatus 10 may be fabricated from a high-strength, lightweight material, such as aluminum. To assist with rotation of the sidebar 70 about the first axis A, the first mating component 20 has a female mating element 120 disposed within a substantially cylindrical portion 23 of the first mating component 20, as shown in FIGS. 4-5. The female mating element 120 provides a substantially cylindrical recess 25 formed in the cylindrical portion 23 of the first mating component 20. A flange 21 having a substantially rectangular configuration with substantially rounded corners on a free end 26 of the flange 21 extends away from and is integrally connected to the cylindrical portion 23 of the first mating component 20. A substantially cylindrical threaded blind bore 24 may extend from the cylindrical recess 25 of the female mating element 120 inward toward the flange 21 for receiving a threaded fastener (not shown). The radial centers of the female mating element 120, the cylindrical portion 23, and the blind bore 24 are substantially coaxial. The flange 21 may have a substantially cylindrical aperture 22 extending therethrough for attaching the apparatus 10 to the archery bow riser 200 through the use of the conventional fastener.

Figure 6:
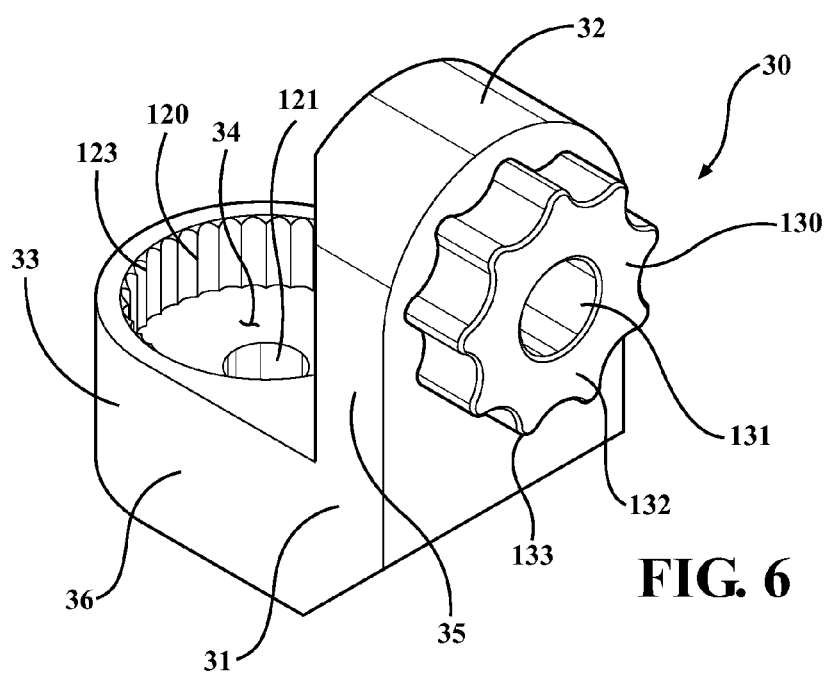
FIG. 6 is a perspective view showing a second mating component of the apparatus of the present invention.

To assist with rotation of the sidebar 70 about the first axis A and the second axis B, the second mating component 30 provides a substantially right-angled bracket 31 with a male mating element 130 formed on a first leg 35 of the right-angled bracket 31 and a female mating element 120 formed on a second leg 36 of the right-angled bracket 31 wherein the first leg 35 and the second leg 36 are substantially perpendicular to one another, as shown in FIG. 6. The female mating element 120 has a substantially cylindrical recess 34 formed in the second leg 36 of the right-angled bracket 31, and the male mating element 130 has a substantially spur configuration formed in the first leg 35 of the right-angled bracket 31, as will be described shortly. The substantially right-angled bracket 31 may have substantially rounded free ends 32, 33 formed in the first and second legs 35, 36, respectively.

To assist with rotation of the sidebar 70 about the second axis B, the third mating component 40 has one male mating element 130 positioned and integrally connected on one end 44 of the third mating component 40, as shown in FIG. 7, wherein the end 44 of the third mating component 40 has a substantially rectangular configuration with a rounded end. The male mating element 130 of the third mating component 40 has a substantially spur configuration, as will be described in detail shortly. A housing 41 with a substantially cylindrical recess 42 may be integrally formed on an opposing end 45 of the third mating component 40 to secure a first connecting component 50 thereto. A substantially rectangular recess 43 extends through the cylindrical recess 42 on the opposing end 45 of the third mating component 40 to allow for a fastener (not shown) to attach to the first connecting component 50 housed within the cylindrical recess 42. The housing 41 of the third mating component 40 receives the first connecting component 50 and allows for rotation of the third mating component 40 about the second axis B. The first connecting component 50, shown in FIG. 8, is substantially cylindrical with a longitudinal axis C extending through the radial center of the first connecting component 50. A substantially cylindrical aperture 51 extends through the first connecting component 50 substantially perpendicular to the longitudinal axis C.

To allow the sidebar 70 to quickly connect to the apparatus 10, the apparatus 10 may include a second connecting component 60 having a head 61 and a body 62, as shown in FIGS. 9-10. The head 61 and the body 62 are substantially cylindrical and integrally connected. The head 61 and the body 62 each have an aperture 66, 67, respectively, extending therethough, wherein the radial centers of the head 61 and the body 62 are substantially coaxial, and the aperture 67 has a larger diameter than the aperture 66. A chamfer 64 is formed in the opening of the aperture 66 of the second connecting component 60 for receiving a conventional fastener (not shown). The outer diameter of the head 61 may be larger than the outer diameter of the body 62, such that a shoulder 63 is formed between the head 61 and the body 62. A plurality of annular grooves 68 may be formed in an exterior surface 65 of the body 62 of the second connecting component 60 to allow for the exterior surface 65 to grip and secure the sidebar 70 to the second connecting component 60. To permit this quick connect attachment of the sidebar 70 to the second connecting component 60, the inner diameter of the sidebar 70 may be slightly larger than the outer diameter of the exterior surface 65 of the second connecting component 60.

As previously stated, the interlocking couplings 100 allow the apparatus 10 to rotationally adjust the sidebar 70 about the axes A and B. As shown in FIG. 11, each interlocking coupling 100 is comprised of a conventional fastener 110, one female mating element 120, and one male mating element 130. As shown in FIGS. 1-12, the female mating elements 120 are provided in the first mating component 20 and the second mating component 30, while the male mating elements 130 are provided in the second mating component 30 and the third mating component 40. However, other variations are possible. Each female mating element 120 has a substantially cylindrical configuration with a substantially cylindrical aperture or recess 122 and a substantially cylindrical aperture 121 extending though the radial center of the female mating element 120 for receiving a conventional fastener 110. The substantially cylindrical aperture 122 is defined longitudinally by a plurality of adjoining, arcuate recesses 123. Thirty-six arcuate recesses 123 are shown, although the number of arcuate recesses 123 may vary depending on the desired rotational increments of the interlocking coupling 100.

Similar to the female mating element 120, the male mating element 130 is substantially cylindrical with a substantially cylindrical aperture 131 extending therethough at its radial center for receiving the conventional fastener 110. The male mating element 130 includes a protruding spur-like disc 132 having a plurality of radially extending, rounded protrusion points or teeth 133 that are circumferentially spaced in a substantially even manner around the protruding disc 132. The number of protrusion points 133 may vary depending on the rotational increments that are desired, wherein the number of protrusion points 133 corresponds to the number of rotational positions. The cylindrical aperture 122 of the female mating element 120 receives the protruding disc 132 of the male mating element 130. The outside diameter of the protruding disc 132 of the male mating element 130 may be slightly smaller than the inside diameter of the cylindrical aperture 122 of the female mating element 120 to allow for the male mating element 130 to fit and rotate within the female mating element 120. Thus, the protrusion points 133 are designed to engage the arcuate recesses 123 in the female mating element 120, yet the protrusion points 133 can be rotated to different arcuate recesses 123 in the female mating element 120 via an interference or frictional fit. FIGS. 12A-12D show alternative embodiments of the male mating element 130, wherein each embodiment of the male mating elements 130 provide a different number of protrusion points 133. FIG. 12A shows the male mating element 130 having three protrusion points 133 in a substantially triangular configuration. FIG. 12B shows the male mating element 130 having six protrusion points 133 in a substantially six-pointed star configuration. FIG. 12C shows the male mating element 130 having nine protrusion points 133 in a substantially nine-pointed star configuration. FIG. 12D shows the male mating element 130 having twelve protrusion points 133 in a substantially twelve-pointed star configuration.

To assemble the apparatus 10 as shown in FIGS. 1-3, the male mating element 130 of the second mating component 30 is inserted into the female mating element 120 of the first mating component 20. The first mating component 20 is secured to the second mating component 30 through the use of a conventional fastener. The male mating element 130 on the third mating component 40 is then inserted into the female mating element 120 of the second mating component 30. The third mating component 40 is secured to the second mating component 30 through the use of another conventional fastener. The first connecting component 50 may then be inserted into the housing 41 of the third mating component 40, such that the cylindrical recess 42 is accessible through the rectangular recess 43 on the third mating component 40. The second connecting component 60 is attached to the third mating component 40 by positioning the second connecting component 60 near the first connecting component 50 of the apparatus 10 and aligning the passageway 64 of the second connecting component 60 with the cylindrical aperture 51 of the first connecting component 50. The second connecting component 60 is secured to the apparatus 10 through the use of a conventional fastener (not shown) inserted into the passageway 64 in the second connecting component 60 and the cylindrical aperture 51 of the first connecting component 50. The sidebar 70 is attached to the second connecting component 60 by sliding the sidebar 70 over the exterior surface 65 of the second connecting component 60 until an end 73 of the sidebar 70 abuts the shoulder 63 of the second connecting component 60. Weights 71 may then be added to the opposite end of the sidebar 70 to provide additional stabilization for the archery bow.

Once assembled, the apparatus 10 may be attached to an archery bow using a conventional fastener (not shown). The conventional fastener is inserted through the cylindrical aperture 22 in the flange 21 of the first mating component 20 into the threaded aperture in the archery bow riser 200. The apparatus 10 is used by rotating the sidebar 70 about the first axis A and the second axis B into the desired position. The rotational adjustment is maintained by the apparatus 10 due to the plurality of protrusion points 133 on the male mating elements 130 engaging the plurality of arcuate recesses 123 in the female mating elements 120. The size of the increments of rotational adjustment that can be held by the apparatus 10 will depend on the number of arcuate recesses 123 formed in the female mating elements 120 and the protrusion points 133 formed on the male mating elements 130. The more arcuate recesses 123 and protrusion points 133 that are present, the smaller the increments of rotation. Conversely, the less arcuate recesses 123 and protrusion points 133 that are present, the larger the increments of rotation. For example, having thirty-six arcuate recesses 123 and twelve protrusion points 133 results in rotational increments of 0.83 degrees that can be maintained, while having thirty-six arcuate recesses 123 and three protrusion points 133 results in rotational increments of 3.33 degrees that can be maintained. The apparatus 10 may be moved into a second position by rotating the sidebar 70 about the first axis A and the second axis B.

In addition to rotationally adjusting the sidebar 70, the apparatus 10 also allows the archer to quickly replace sidebars 70. The sidebar 70 can be removed by pulling the sidebar 70 away from the second connecting component 60. The replacement sidebar 70 can be connected in the same manner that the initial sidebar 70 was attached to the apparatus 10.

While the invention has been shown and described with reference to a certain specific preferred embodiment, modification may now suggest itself to those skilled in the art. Such modifications and various changes in form and detail may be made herein without departing from the spirit and scope of the invention. Accordingly, it is understood that the invention will be limited only by the appended claims.

What is claimed is:

1. An apparatus for mounting a sidebar to an archery bow, comprising:
   a first and second interlocking coupling, wherein the first and second interlocking coupling each has a male mating element, a female mating element, and a fastener connecting the male mating element to the female mating element;
   the male mating element having a plurality of protrusion points;
   the female mating element having a substantially cylindrical aperture defined by a plurality of arcuate recesses;
   wherein for each of the first and second interlocking coupling, the plurality of protrusion points of the male mating element engage the plurality of arcuate recesses of the female mating element to provide and maintain rotational adjustment about a first and second axis, respectively,
   wherein the first and second interlocking couplings provide rotational adjustment about said first and second axis.

2. The apparatus of claim 1, wherein the plurality of arcuate recesses of each of the female mating elements further comprises:
   thirty-six arcuate recesses.

3. The apparatus of claim 1, wherein the plurality of protrusion points of each of the male mating elements is a factor of three.

4. The apparatus of claim 1, wherein the first and second axis of rotational adjustment are substantially perpendicular.

5. An apparatus for mounting a sidebar to an archery bow, comprising:
   a first mating component connectable to the archery bow and having a first female mating element having a substantially cylindrical aperture defined by a plurality of arcuate recesses;
   a second mating component having a first male mating element and a second female mating element having a substantially cylindrical aperture defined by a plurality of arcuate recesses, the first male mating element having a plurality of protrusion points for engaging the plurality of arcuate recesses of the first female mating element of the first mating component to provide and maintain rotational adjustment about a first axis; and
   a third mating component having a second male mating element and connectable to the sidebar, the second male mating element having a plurality of protrusion points for engaging the plurality of the arcuate recesses of the second female element of the second mating component to provide and maintain rotational adjustment about a second axis.

6. The apparatus of claim 5, wherein at least one of either the plurality of arcuate recesses of the first female mating element or the plurality of arcuate recesses of the second female mating element further comprises:
thirty-six arcuate recesses.

7. The apparatus of claim 5, wherein at least one of either the plurality of protrusion points of the first male mating element or the plurality of protrusion points of the second male mating element is a factor of three.

8. The apparatus of claim 5, further comprising:
a first fastener for securing the first female mating element of the first mating component to the first male mating element of the second mating component; and
a second fastener for securing the second female mating element of the second mating component to the second male mating element of the third mating component.

9. The apparatus of claim 8, wherein the first male mating element and the second female mating element of the second mating component are at a substantially ninety degree angle from one another.

10. The apparatus of claim 5, wherein the first axis and second axis are substantially perpendicular.

11. The apparatus of claim 5, wherein the third mating component further comprises:
a housing having a substantially cylindrical recess and a substantially rectangular recess, wherein the substantially rectangular recess extends through the substantially cylindrical recess on an end of the third mating component.

12. The apparatus of claim 11, further comprising:
a first connecting component being a substantially cylindrical shape with a longitudinal axis extending through the radial center of the first connecting component, a substantially cylindrical aperture extends through the first connecting component substantially perpendicular to the longitudinal axis; and
a second connecting component having a head and a body, the head and the body are substantially cylindrical with each having an aperture extending therethrough wherein the radial centers of the head and body are coaxially aligned;
wherein the first connecting component is positioned within the substantially cylindrical recess in the housing of the third mating component, and a fastener secures the second connecting component to the first connecting component.

13. The apparatus of claim 12, wherein the second connecting component further comprises:
a plurality of annular grooves formed in an exterior surface of the body of the second connecting component.

14. The apparatus of claim 5, wherein the second mating component can be rotated 360 degrees with respect to the first mating component.

15. The apparatus of claim 5, wherein the third mating component can be rotated 360 degrees with respect to the second mating component.

16. An apparatus for mounting a sidebar to an archery bow, comprising:
a first mating component connectable to the archery bow and having a first female mating element having a substantially cylindrical aperture defined by a plurality of arcuate recesses;
a second mating component having a first male mating element and a second female mating element, the second female mating element having a substantially cylindrical aperture defined by a plurality of arcuate recesses, the first male mating element having a plurality of protrusion points for engaging the plurality of arcuate recesses on the first female mating element of the first mating component to provide rotational adjustment about a first axis;
a third mating component having a second male mating element, the second male mating element having a plurality of protrusion points for engaging the plurality of the arcuate recesses on the second female element of the second mating component to provide rotational adjustment about a second axis, wherein the first axis and second axis are substantially perpendicular;
a first fastener for securing the first female mating element of the first mating component to the first male mating element of the second mating component;
a second fastener for securing the second female mating element of the second mating component to the second male mating element of the third mating component;
a housing having a substantially cylindrical recess and a substantially rectangular recess, wherein the substantially rectangular recess extends through the substantially cylindrical recess on an end of the third mating component;
a first connecting component being a substantially cylindrical shape with a longitudinal axis extending through the radial center of the first connecting component, a substantially cylindrical aperture extends through the first connecting component substantially perpendicular to the longitudinal axis; and
a second connecting component having a head and a body, the head and the body being substantially cylindrical with each having an aperture extending therethrough wherein the radial centers of the head and body are coaxially aligned, the body being connectable to the sidebar, wherein the first connecting component is positioned within the substantially cylindrical recess in the housing of the third mating component, and a fastener secures the second connecting component to the first connecting component.

17. The apparatus of claim 16, where at least one of either the plurality of arcuate recesses of the first female mating element of the first mating component or the plurality of arcuate recesses of the second female mating element of the second mating component further comprise:
thirty-six arcuate recesses.

18. The apparatus of claim 16, wherein at least one of either the plurality of protrusion points of the first male mating element or the plurality of protrusion points of the second male mating element is a factor of three.

19. The apparatus of claim 16, wherein the second mating component can be rotated 360 degrees with respect to the first mating component.

20. The apparatus of claim 16, wherein the third mating component can be rotated 360 degrees with respect to the second mating component.

* * * * *